United States Patent
Kinoshita et al.

(10) Patent No.: US 8,909,451 B2
(45) Date of Patent: Dec. 9, 2014

(54) MOTORCYCLE INCLUDING TRACTION CONTROL

(75) Inventors: Tomohiro Kinoshita, Shizuoka (JP); Hirokazu Fujita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 103 days.

(21) Appl. No.: 13/514,298

(22) PCT Filed: Nov. 30, 2010

(86) PCT No.: PCT/JP2010/071343
§ 371 (c)(1),
(2), (4) Date: Jun. 7, 2012

(87) PCT Pub. No.: WO2011/070941
PCT Pub. Date: Jun. 16, 2011

(65) Prior Publication Data
US 2012/0239267 A1    Sep. 20, 2012

(30) Foreign Application Priority Data

Dec. 10, 2009  (JP) ................. 2009-281005

(51) Int. Cl.
| | |
|---|---|
| *G06F 7/00* | (2006.01) |
| *B60T 13/00* | (2006.01) |
| *F02D 29/02* | (2006.01) |
| *B60K 28/16* | (2006.01) |
| *F02D 11/10* | (2006.01) |
| *F02D 41/02* | (2006.01) |

(52) U.S. Cl.
CPC ........... *F02D 29/02* (2013.01); *B60K 28/16* (2013.01); *F02D 11/105* (2013.01); *F02D 41/021* (2013.01); *B60W 2520/263* (2013.01); *B60W 2720/26* (2013.01); *B60Y 2200/12* (2013.01)
USPC .......... 701/71; 303/9.64; 303/137; 701/82; 701/90

(58) Field of Classification Search
USPC .......... 701/71, 82, 90; 303/9.64, 137; 434/61; 340/427
See application file for complete search history.

(56) References Cited

U.S. PATENT DOCUMENTS

| | | |
|---|---|---|
| 5,731,976 A | 3/1998 | Tsuyama et al. |
| 5,813,936 A | 9/1998 | Kichima et al. |
| 2008/0105479 A1* | 5/2008 | Nishiike et al. ............... 180/197 |

FOREIGN PATENT DOCUMENTS

| | | |
|---|---|---|
| JP | 07-156816 A | 6/1995 |
| JP | 07-208225 A | 8/1995 |

(Continued)

OTHER PUBLICATIONS

Official Communication issued in International Patent Application No. PCT/JP2010/071343, mailed on Feb. 8, 2011.

*Primary Examiner* — Yonel Beaulieu
(74) *Attorney, Agent, or Firm* — Keating & Bennett, LLP

(57) ABSTRACT

A motorcycle sets a target slip value based on an accelerator operation by a driver, and prevents a significant decrease in the output torque of the drive power source during execution of traction control to provide a comfortable ride. The motorcycle includes a target slip value calculating section that calculates a target slip value, based on an accelerator operation by a driver; and an actual slip value calculating section that calculates an actual slip value, based on the difference between the rotation speed of the front wheel and the rotation speed of the rear wheel. The motorcycle further includes a drive power source controller arranged and programmed to reduce the output torque of the drive power source, based on the difference between a criterion value different from the target slip value and the actual slip value when the actual slip value is lower than the target slip value.

11 Claims, 8 Drawing Sheets

(56) References Cited

FOREIGN PATENT DOCUMENTS

| | | | |
|---|---|---|---|
| JP | 09-249050 A | 9/1997 | |
| JP | 11-270383 A | 10/1999 | |
| JP | 2008-111430 A | 5/2008 | |

\* cited by examiner

MOTORCYCLE INCLUDING TRACTION CONTROL

BACKGROUND OF THE INVENTION

1. Field of the Invention

The present invention relates to a motorcycle that executes traction control.

2. Description of the Related Art

Conventionally, some motorcycles execute traction control for preventing an excessive slip of the rear wheel by reducing an engine torque. Such conventional motorcycles set target values (hereinafter referred to as a target slip value) for a slip value (that is, a slip amount that is a difference in the rotation speed between the front wheel and the rear wheel, or a slip ratio that is a ratio of the difference described above to the rotation speed of the rear wheel). In such a motorcycle, the engine is controlled such that an actual slip value calculated based on the difference in the rotation speed between the front wheel and the rear wheel follows the target slip value.

According to the motorcycle described in Japanese Patent Laid-open Publication No. 2008-111430, the target slip value is set in accordance with an accelerator opening degree such that a larger accelerator opening degree (the operation amount of the accelerator by the driver) leads to a higher target slip value. With the above configuration, it is possible not only to prevent an excessive slip of the rear wheel but also to realize a slip in accordance with an acceleration request of the driver. According to the motorcycle described in Japanese Patent Laid-open Publication No. 2008-111430, traction control starts after the actual slip value exceeds the target slip value, and thereafter, during execution of the traction control, an engine output torque (hereinafter referred to as an engine torque) is controlled based on the difference between the actual slip value and the target slip value such that the actual slip value follows the target slip value.

According to the motorcycle described in Japanese Patent Laid-open Publication No. 2008-111430, traction control starts after the actual slip value exceeds the target slip value. Thus, in order to make the actual slip value the same as the target slip value in a shorter period, a significant decrease in the engine torque is necessary at the start of the traction control, which deteriorates the comfort of riding.

In order to address the above problems, it may be an option that the traction control starts before the actual slip value reaches the target slip value. However, in Japanese Patent Laid-open Publication No. 2008-111430, the engine torque is controlled based on the difference between the actual slip value and the target slip value even when the actual slip value is lower than the target slip value. Therefore, start of the traction control according to Japanese Patent Laid-open Publication No. 2008-111430 before the actual slip value reaches the target slip value results in an increase in the engine torque which makes the actual slip value closer to the target slip value. That is, start of the traction control results in an increase in the engine torque irrespective of an accelerator operation by the driver. This consequently deteriorates the riding comfort.

SUMMARY OF THE INVENTION

In view of the above-described problems, preferred embodiments of the present invention provide a motorcycle that sets a target slip value according to an accelerator operation by a driver, and prevents a significant decrease in an output torque from the drive power source and also improves riding comfort during execution of traction control.

A motorcycle according to a preferred embodiment of the present invention includes a target slip value calculating section that calculates a target slip value, based on an accelerator operation by a driver; and an actual slip value calculating section that calculates an actual slip value, based on the difference between the rotation speed of the front wheel and the rotation speed of the rear wheel. Further, the motorcycle includes a drive power source controller arranged and programmed to reduce an output torque of the drive power source, based on the difference between the actual slip value and a criterion value that is different from the target slip value, when the actual slip value is lower than the target slip value.

According to a preferred embodiment of the present invention, even when the actual slip value is lower than the target slip value, an output torque from the drive power source is reduced. Therefore, it is possible to cause the actual slip value to get closer to the target slip value after the actual slip value exceeds the target slip value while being able to eliminate any significant decrease in the output torque from the drive power source. Further, when the actual slip value is lower than the target slip value, the output torque of the drive power source is reduced based on the difference between the actual slip value and a criterion value that is different from the target slip value. Therefore, when the actual slip value is lower than the target slip value, it is possible to prevent an increase in the output torque, independent of an accelerator operation by the driver, and thus to improve the riding comfort of the motorcycle. Note that the drive power source is a device that outputs a torque to be transmitted to the driving wheel of the motorcycle, and preferably includes an engine and a motor that drives based on electricity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
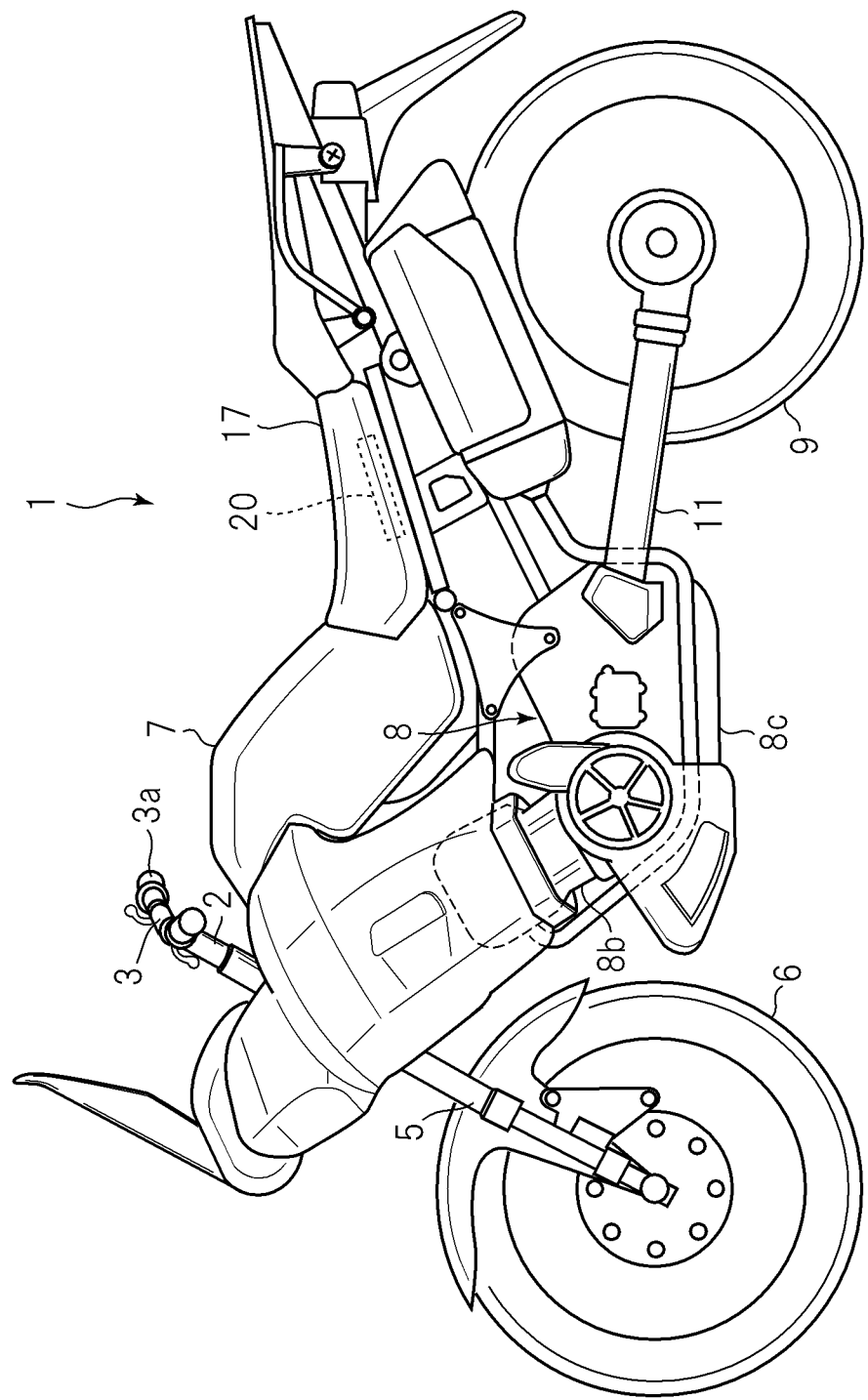
FIG. 1 is a side view of a motorcycle according to one preferred embodiment of the present invention.

In the following, preferred embodiments of the present invention will be described with reference to the drawings. FIG. 1 is a side view of a motorcycle 1 according to a preferred embodiment of the present invention.

As shown in FIG. 1, the motorcycle 1 includes a handle bar 3 mounted in a front portion thereof. The handle bar 3 includes, at one end thereof, an accelerator grip 3a for operation by a driver. The handle bar 3 is fixed to a steering stem 2. The steering stem 2 is connected to the front wheel (a following wheel) 6 via a front fork 5. The steering stem 2 is supported for rotation in the left-right direction. The handle bar 3, the steering stem 2, the front fork 5, and the front wheel 6 rotate together in the left-right direction.

An engine (a drive power source) 8 is provided at the rear of the front wheel 6, and a rear wheel (the drive wheel) 9 is provided at the rear of the engine 8. A torque output from the engine 8 is transmitted to the rear wheel 9 via a transmission member, such as a chain, a shift, or the like. In this example, a swing arm 11 is provided at the rear of the engine 8, extending in the front-rear direction. The torque from the engine 8 is transmitted to the rear wheel 9 via a drive shaft (not shown) provided inside the swing arm 11. A fuel tank 7 is arranged above the engine 8. A seat 17 is arranged at the rear of the fuel tank 7.

Figure 2:
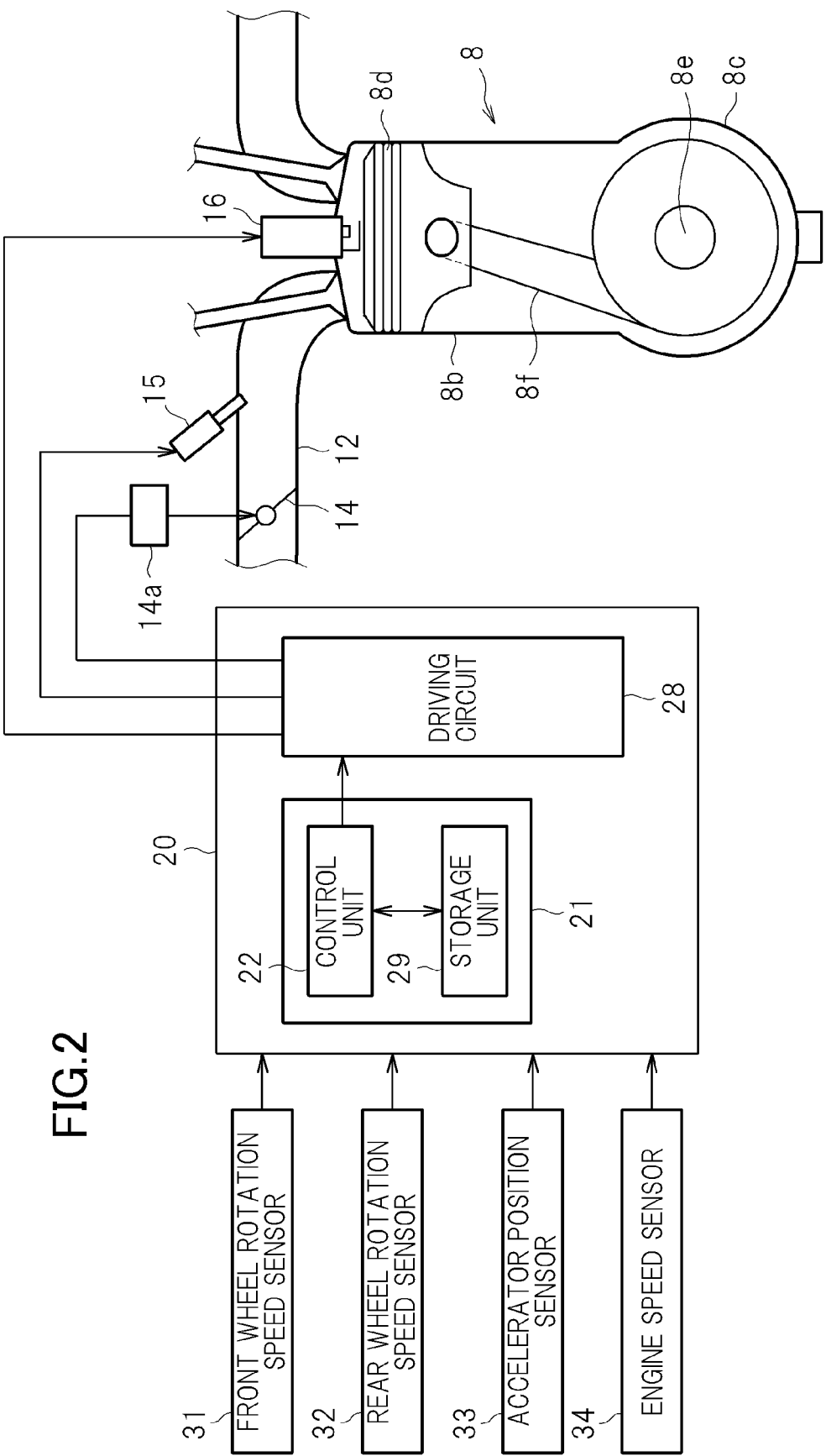
FIG. 2 is a schematic diagram showing a structure of an engine and an engine control device of the motorcycle.

FIG. 2 is a diagram schematically showing a structure of the engine 8 and an engine control device 20 that controls the engine 8. As shown in FIG. 2, the engine 8 includes a crank case 8c and a cylinder 8b. A piston 8d is provided in the cylinder 8b. The piston 8d is connected to a crank shaft 8e arranged in the crank case 8c via a connection rod 8f, so that up-down movement of the piston 8d causes the crank shaft 8e to rotate. Rotation (torque) of the crank shaft 8e is decelerated by a transmission (not shown) arranged in the engine 8, and output from the engine 8. A suction pipe 12 is connected to the cylinder 8b. The suction pipe 12 includes a throttle valve 14 arranged therein to adjust the air flow flowing inside the suction pipe 12. The throttle valve 14 is an electronically controlled throttle valve, and an actuator 14a that moves the throttle valve 14 in the open/close direction is provided. Further, an injector 15 is provided to inject the fuel supplied from the fuel tank 7 to the suction pipe 12. An ignition plug 16 is provided to ignite the fuel flowing from the suction pipe 12 to the cylinder 8b.

As shown in FIG. 2, the engine control device 20 includes a microprocessor 21 and a driving circuit 28. A front wheel rotation speed sensor 31, a rear wheel rotation speed sensor 32, an accelerator position sensor 33, and an engine speed sensor 34 are connected to the engine control device 20.

The front wheel rotation speed sensor 31 detects the rotation speed of the front wheel 6. The front wheel rotation speed sensor 31 utilizes an electromagnetic pickup or a rotation speed sensor utilizing a magnetic resistive element, and outputs a signal in accordance with the rotation speed of the front wheel 6. The rear wheel rotation speed sensor 32 detects the rotation speed of the rear wheel 9. Similar to the front wheel rotation speed sensor 31, the rear wheel rotation speed sensor 32 is a rotation speed sensor utilizing an electromagnetic pickup method, or the like, and outputs a signal in accordance with the rotation speed of the rear wheel 9. The rear wheel rotation speed sensor 32 may be provided at the rear wheel 9 or to a transmission member (e.g., a gear provided in the engine 8, a drive shaft provided in the swing arm 11) to transmit the torque from the engine 8 to the rear wheel 9. Signals output from the front wheel rotation speed sensor 31 and the rear wheel rotation speed sensor 32 are input to the microprocessor 21.

The accelerator position sensor 33 detects the amount of acceleration operation by the driver, that is, the amount of operation of an accelerator grip 3a by the driver (a rotation angle of the accelerator grip 3a (hereinafter referred to as an accelerator opening degree)). The accelerator position sensor 33 includes, e.g., a potentiometer, and outputs a signal in accordance with the accelerator opening degree. A signal output from the accelerator position sensor 33 as well is input to the microprocessor 21.

The engine speed sensor 34 detects the engine speed. The engine speed sensor 34 includes a rotation speed sensor utilizing an electromagnetic pickup or the like, and outputs a signal having a frequency corresponding to the rotation speed of the crank shaft 8e, for example.

The microprocessor 21 includes a control unit 22 and a storage unit 29. The control unit 22 includes a CPU (central processing unit), and operates according to a program stored in the storage unit 29. In this example, the control unit 22 calculates the rotation speed of the front wheel 6 (hereinafter referred to as a front wheel speed Vf), based on a signal output from the front wheel rotation speed sensor 31, and further calculates the rotation speed of the rear wheel 9 (hereinafter referred to as a rear wheel speed Vr), based on a signal output from the rear wheel rotation speed sensor 32. Further, the control unit 22 calculates the engine speed, based on a signal output from the engine speed sensor 34. Further, the control unit 22 determines the accelerator opening degree, based on a signal output from the accelerator position sensor 33. The control unit 22 controls the engine 8, based on these data. Specifically, the control unit 22 calculates control parameters for the engine 8, such as the opening degree of the throttle valve 14 (hereinafter referred to as a throttle valve opening degree), a fuel injection amount for the injector 15, an ignition timing for the ignition plug 16, and so forth, that have influence on the engine torque. The control unit 22 outputs a signal in accordance with the control parameter to the drive circuit 28 to control the throttle valve opening degree, the fuel injection amount, and the ignition time. In this preferred embodiment, the control unit 22 adjusts the throttle valve opening degree, the fuel injection amount, and the ignition time to reduce the engine torque to thereby prevent an excessive slip of the rear wheel 9. That is, the control unit 22 executes traction control.

The storage unit 29 includes a memory device, such as a RAM (Random Access Memory), a ROM (Read Only Memory), and so forth, and stores a program to be executed by the control unit 22, and a map and a formula to be used in the control process performed by the control unit 22.

According to a signal output from the control unit 22, the driving circuit 28 supplies power to the actuator 14a of the throttle valve 14, the injector 15, and the ignition plug 16 to drive according to a signal output from the control unit 22.

Figure 3:
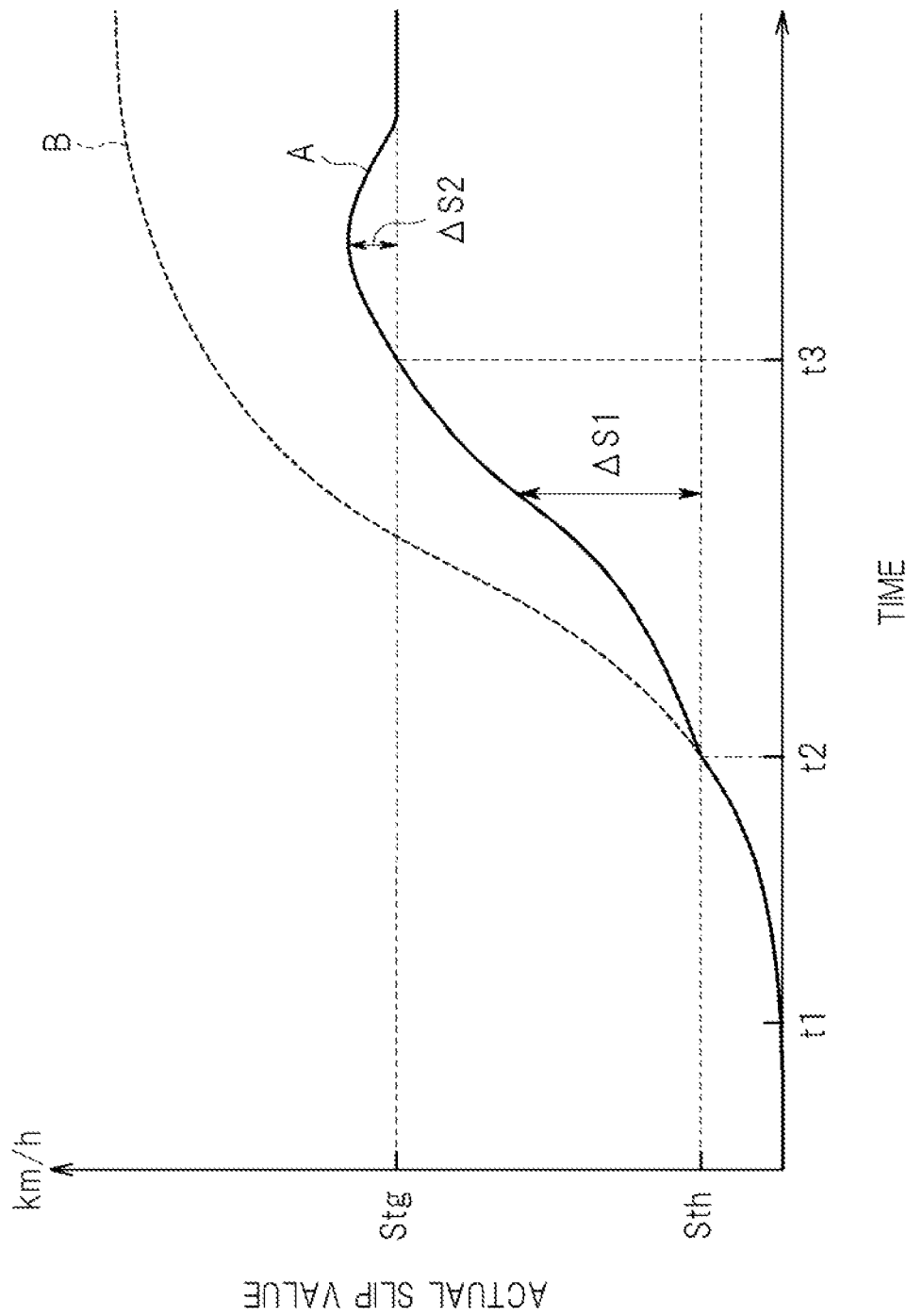
FIG. 3 is a diagram describing an outline of control executed by a control unit of the engine control device.

Control by the control unit 22 will be described. FIG. 3 is a diagram explaining an outline of control by the control unit 22. In the diagram, the ordinate indicates a slip value that is calculated based on the difference between the front wheel speed Vf and the rear wheel speed Vr (hereinafter referred to as an actual slip value Sr (Sr=Vr−Vf)). The solid line A indicates an example change of the actual slip value Sr when the control unit 22 executes traction control. The broken line B indicates an example change of the actual slip value Sr with traction control not being executed.

As shown in the diagram, under control by the control unit 22, a target value (hereinafter referred to as a target slip value Stg) is set for the actual slip value Sr. Further, for this control, a slip value (hereinafter referred to as a slip threshold Sth) at which the control unit 22 starts reduction of the engine torque is set. As to be described later, the target slip value Stg and the slip threshold Sth are set based on an accelerator operation by the driver. Specifically, the target slip value Stg becomes higher in accordance with an increase in the accelerator opening degree (the absolute value of the accelerator opening degree) or the change amount of the accelerator opening degree within a predetermined period of time (an increase amount of the accelerator opening degree).

As shown in FIG. 3, when the accelerator grip 3a is operated at t1 and the engine torque increases, the actual slip values Sr resultantly starts increasing. Thereafter, the actual slip value Sr reaches the slip threshold Sth at t2, and then the target slip value Stg at t3.

In this preferred embodiment, when the actual slip value Sr is lower than the target slip value Stg, that is, during the period from t2 to t3, the control unit 22 reduces the engine torque, based on the difference ΔS1 between the actual slip value Sr and a criterion value that is equal to or smaller than the slip threshold Sth. Specifically, the control unit 22 calculates the above described control parameter, based on the difference ΔS1, and reduces the engine torque from that at normal driving (driving free from traction control) by an amount in accordance with the difference ΔS1 (hereinafter this processing is referred to as first processing). Thus, the reduction amount for the engine torque increases as the actual slip value Sr becomes higher, and accordingly, the difference between the actual slip value indicated by the line B and the actual slip value Sr indicated by the line A also becomes larger.

In the example described here, the slip threshold Sth is set as the criterion value mentioned above. That is, the control unit 22 reduces the engine torque, based on the difference between the slip threshold Sth and the actual slip value Sr.

When the actual slip value Sr is higher than the target slip value Stg, that is, at t3 and thereafter in FIG. 3, the control unit 22 reduces the engine torque based on the difference ΔS2 between the actual slip value Sr and the target slip value Stg such that the actual slip value Sr decreases toward the target slip value Stg. Specifically, the control unit 22 calculates the above described control parameter, based on the difference ΔS2, and reduces the engine torque from that at normal driving by an amount in accordance with the difference ΔS2 (hereinafter this processing is referred to as second processing).

In this preferred embodiment, the second processing is executed only when the actual slip value Sr is higher than the target slip value Stg. In other words, when the actual slip value Sr is lower than the target slip value Stg, execution of the processing for reducing the engine torque based on the difference ΔS2 between the actual slip value Sr and the target slip value Stg is restricted. Meanwhile, the first processing for reducing the engine torque based on the difference ΔS1 between the slip threshold Sth and the actual slip value Sr is executed when the actual slip value Sr is higher than the slip threshold Sth. That is, the first processing is executed in both of the cases in which the actual slip value Sr is higher than the target slip value Stg and in which the actual slip value Sr is lower than the target slip value Stg. Therefore, when the actual slip value Sr is higher than the target slip value Stg, the first processing and the second processing are both executed. That is, when the actual slip value Sr is higher than the target slip value Stg, the control parameter is calculated based on the difference ΔS1 between the actual slip value Sr and the slip threshold Sth and the difference ΔS2 between the actual slip value Sr and the target slip value Stg. Meanwhile, when the actual slip value Sr is lower than the target slip value Stg, use of the difference ΔS2 in calculation of the control parameter is restricted. Note that FIG. 3 shows a case in which the actual slip value Sr reaches the target slip value Stg. However, when the engine torque is sufficiently small or the friction resistance of a road surface is high, a slip can be gradually eliminated through the first processing alone for reducing the engine torque based on the difference between the actual slip value Sr and the slip threshold Sth. In this case, the actual slip value Sr does not reach the target slip value Stg.

Figure 4:
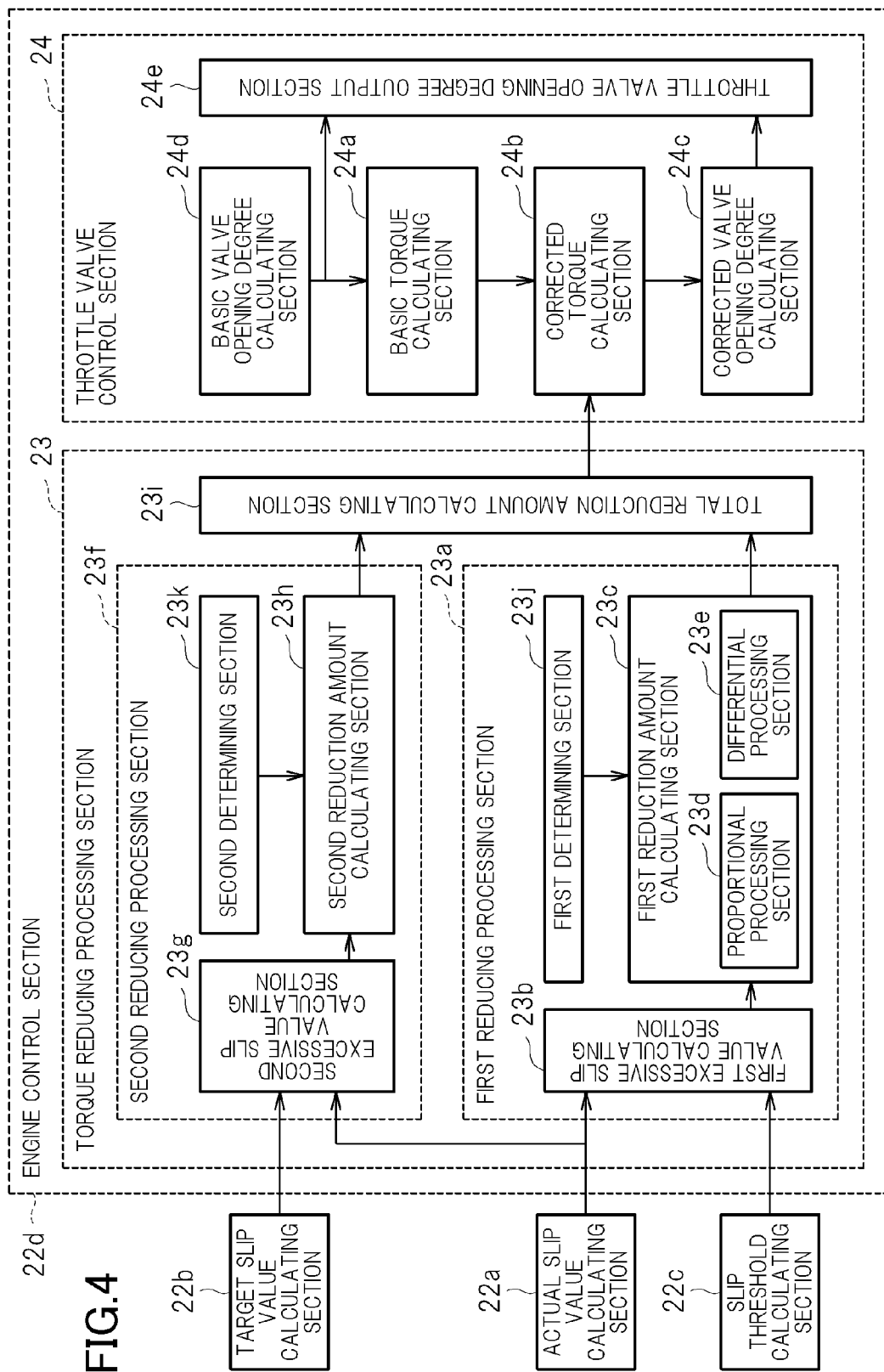
FIG. 4 is a block diagram showing functions of the control unit.

Hereinafter, detail processing executed by the control unit 22 will be described. FIG. 4 is a block diagram showing functions of the control unit 22. The control unit 22 includes an actual slip value calculating section 22a, a target slip value calculating section 22b, a slip threshold calculating section 22c, and an engine control section (drive power source control section) 22d.

As described above, the control unit 22 calculates the front wheel speed Vf and the rear wheel speed Vr, based on a signal output from the front wheel rotation speed sensor 31 and a signal output from the rear wheel rotation speed sensor 32. The actual slip value calculating section 22a calculates the actual slip value Sr, based on the front wheel speed Vf and the rear wheel speed Vr. In this example, the difference (Vr−Vf) between the front wheel speed Vf and the rear wheel speed Vr is defined as the actual slip value Sr.

The target slip value calculating section 22b calculates the target slip value (a target value for the actual slip value Sr), based on an accelerator operation by the driver. Specifically, the target slip value calculating section 22b calculates the target slip value Stg, based on the accelerator opening degree (the absolute value of the accelerator opening degree). In this example, the target slip value calculating section 22b calculates the target slip value Stg, based on the accelerator opening degree and the front wheel speed Vf (that is, the vehicle speed). The target slip value Stg which the target slip value calculating section 22b sets becomes higher as the accelerator opening degree becomes higher. Further, the target slip value Stg which the target slip value calculating section 22b sets becomes higher as the front wheel speed Vf becomes higher. The target slip value calculating section 22b calculates a target slip value Stg in accordance with the accelerator opening degree and the front wheel speed Vf, utilizing a formula or a map stored beforehand in the storage unit 29.

Figure 5:
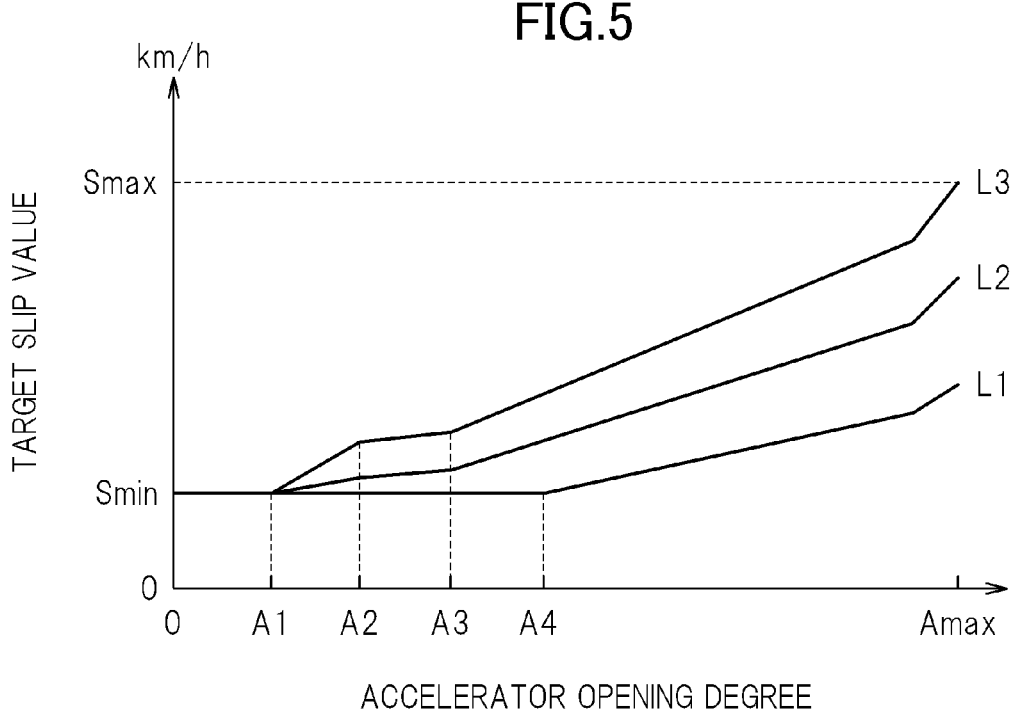
FIG. 5 is a graph showing an example map that correlates an accelerator opening degree, the rotation speed of the front wheel, and the target slip value.

FIG. 5 is a diagram showing an example of a map (hereinafter referred to as a target slip value map) that correlates the accelerator opening degree, the front wheel speed Vf, and the target slip value Stg to one another. In the diagram, the abscissa indicates the accelerator opening degree, while the ordinate indicates the target slip value Stg. The line L1 indicates a relationship between the accelerator opening degree and the target slip value Stg when the front wheel speed Vf is V1 (e.g., about 20 km/h); the line L2 indicates a relationship between the accelerator opening degree and the target slip value Stg when the front wheel speed Vf is V2 (V2>V1, e.g., about 60 km/h); the line L3 indicates a relationship between the accelerator opening degree and the target slip value Stg when the front wheel speed Vf is V3 (V3>V2, e.g., about 100 km/h). Such a target slip value map is stored in the storage unit 29.

As shown in the diagram, according to the target slip value map, a higher accelerator opening degree is correlated to a higher target slip value Stg. Further, a higher front wheel speed Vf is correlated to a higher target slip value Stg. Further, according to the target slip value map, in the range of the accelerator opening degree from 0 to A1, the target slip value Stg is set to the minimum value Smin. For the front wheel speed Vf being V1, the target slip value Stg starts increasing at the accelerator opening degree A4 (A4>A1). Meanwhile, for the front wheel speed Vf being V2 and V3, the target slip value Stg starts increasing at the accelerator opening degree A1. As described above, the target slip value Stg starts to increase at a lower accelerator opening degree when the front wheel speed Vf is high. With such a target slip value Stg, the target slip value Stg will increase in response to a slight accelerator operation at high speed driving (when the front wheel speed Vf is V2 or V3). Consequently, a larger slip is more likely tolerated at high speed driving, compared to low speed driving.

Further, the accelerator opening degree A1 and the maximum value Amax have a range therebetween in which the increase rate of the target slip value Stg relative to the accelerator opening degree is smaller, compared to that in other ranges. Specifically, when the front wheel speed is V2 or V3, in the range of the accelerator opening degree from A2 to A3, the increase rate of the target slip value Stg relative to the accelerator opening degree is smaller, compared to that in other ranges (the ranges between A1 and A2 and between A3 and Amax). With the above, in the range between A2 and A3, in which the accelerator opening degree is likely frequently changed, change in the target slip value Stg is prevented, so that control stability can be improved.

Returning to FIG. 4, a function of the control unit 22 will be described in detail. As described above, the control unit 22 includes the slip threshold calculating section 22c. The slip threshold calculating section 22c calculates the slip threshold Sth described above (a threshold for the actual slip value Sr), based on an accelerator operation by the driver. In this example, the slip threshold calculating section 22c calculates the slip threshold Sth, based on the change amount of the accelerator opening degree within a predetermined period of time (e.g., within a few tens of milliseconds). In more detail, the slip threshold calculating section 22c calculates the slip threshold Sth, based on the increase amount of the accelerator opening degree (hereinafter referred to as an accelerator opening degree increase amount) within a predetermined period of time. Further, in this example, the slip threshold calculating section 22c calculates the slip threshold Sth, based not only on the accelerator opening degree increase amount but also on the front wheel speed Vf (that is, the vehicle speed). That is, within a predetermined range of the accelerator opening degree increase amount, the slip threshold Sth calculated by the slip threshold calculating section 22c becomes higher as the accelerator opening degree increase amount becomes higher. Further, within this range, the slip threshold Sth calculated by the slip threshold calculating section 22c becomes higher as the front wheel speed Vf becomes higher. The slip threshold calculating section 22c calculates a slip threshold Sth in accordance with the accelerator opening degree increase amount and the front wheel speed Vf, utilizing a formula or a map stored beforehand in the storage unit 29.

Figure 6:
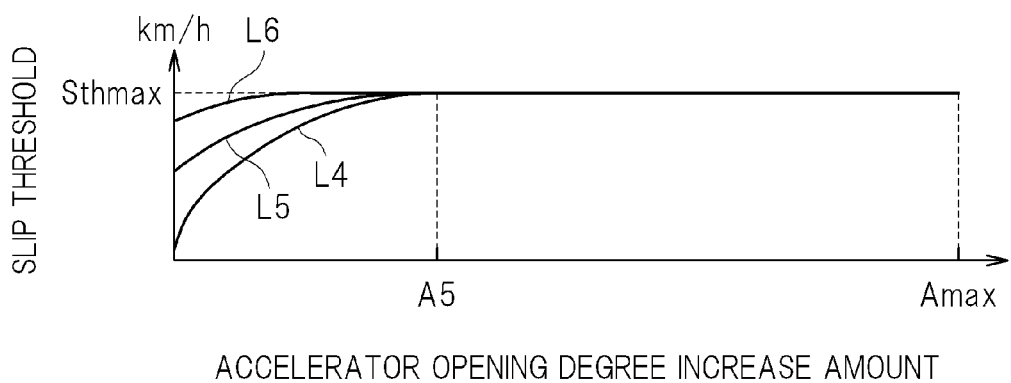
FIG. 6 is a graph showing an example map that correlates an increase in the accelerator opening degree, the rotation speed of the front wheel, and a slip threshold.

FIG. 6 is a diagram showing an example of a map (hereinafter referred to as a slip threshold map) that correlates the accelerator opening degree increase amount, the front wheel speed Vf, and the slip threshold Sth to one another. In the diagram, the abscissa indicates the accelerator opening degree increase amount, while the ordinate indicates the slip threshold Sth. In the diagram, the line L4 indicates a relationship between the accelerator opening degree increase amount and the slip threshold Sth when the front wheel speed Vf is V4 (e.g., about 20 km/h); the line L5 indicates a relationship between the accelerator opening degree increase amount and the slip threshold Sth when the front wheel speed Vf is V5 (V5>V4, e.g., about 60 km/h); the line L6 indicates a relationship between the accelerator opening degree increase amount and the slip threshold Sth when the front wheel speed Vf is V6 (V6>V5, e.g., about 100 km/h). Such a slip threshold map is stored in the storage unit 29.

As shown in the diagram, within the range of the accelerator opening degree increase amount from 0 to A5 (hereinafter referred to as a low increase amount range), the slip threshold Sth becomes higher as the accelerator opening degree increase amount becomes higher. Further, within the low increase amount range, the slip threshold Sth becomes higher as the front wheel speed Vf becomes higher. Meanwhile, within a range higher than the lower increase amount range (hereinafter referred to as a high increase amount range, corresponding to the range from A5 to Amax here), the slip threshold Sth is maintained at a constant value. That is, within the high increase amount range, the slip threshold Sth remains at the maximum value Sthmax. Use of such a slip threshold map makes it possible to prevent activation of traction control upon sudden acceleration of a vehicle on a paved road having a high friction coefficient which unlikely causes a slip, accompanied by a slight slip occurred.

The slip threshold Sth calculated as described above is set as a value lower than the target slip value Stg. That is, with respect to any accelerator opening degree and accelerator opening degree increase amount, the target slip value Stg takes a value higher than the slip threshold Sth. In this example, the minimum value Smin of the target slip value Stg defined in the target slip value map shown in FIG. 5 is a value equal to or larger than the maximum value Sthmax of the slip threshold Sth defined in the slip threshold map shown in FIG. 6.

The range (the difference between the maximum value and the minimum value of the slip threshold Sth) in which the slip threshold Sth may change is smaller, compared to the range (the difference between the minimum value and the maximum value of the target slip value Stg) in which the target slip value Stg may change. Therefore, the range in which the slip threshold Sth changes due to an accelerator operation is smaller, compared to the range in which the target slip value Stg changes.

Returning to FIG. 4, processing by the control unit 22 will be described. As described above, the control unit 22 includes the engine control section 22d that controls the engine 8. In this preferred embodiment, when the actual slip value Sr is higher than the slip threshold Sth, the engine control section 22d calculates the control parameter for the engine 8 such that the engine torque drops to thereby prevent a slip. Here, control using a throttle valve opening degree as a control parameter for the engine 8 to increase/decrease the engine torque will be described as an example.

The engine control section 22d includes as functions thereof a torque reducing processing section 23 and a throttle valve control section 24. The torque reducing processing section 23 includes a first reducing processing section 23a and a second reducing processing section 23f. The throttle valve control section 24 calculates a throttle valve opening degree, based on a reduction amount (hereinafter referred to as a first reduction amount C1) of the engine torque calculated by the first reducing processing section 23a, a reduction amount (hereinafter referred to as a second reduction amount C2) of the engine torque calculated by the second reducing processing section 23f, and the accelerator opening degree. As to be described later, the throttle valve control section 24 makes the throttle valve opening degree smaller as the first reduction amount C1 and the second reduction amount C2 become larger to thereby reduce the engine torque.

Initially, processing of the first reducing processing section 23a will be described. When the actual slip value Sr is higher than the slip threshold Sth, the first reducing processing section 23a calculates the first reduction amount C1, based on the difference (hereinafter referred to as a first excessive slip value ΔS1 (see FIG. 3)) between the actual slip value Sr and the slip threshold Sth. In this preferred embodiment, the first reducing processing section 23a calculates a first reduction amount C1 in accordance with the first excessive slip value ΔS1 not only when the actual slip value Sr is lower than the target slip value Stg but also when the actual slip value Sr is higher than the target slip value Stg.

As shown in FIG. 4, the first reducing processing section 23a in this example includes a first excessive slip value calculating section 23b and a first reduction amount calculating section 23c.

The first excessive slip value calculating section 23b calculates a first excessive slip value ΔS1 (ΔS1=Sr−Sth), that is, the difference between the actual slip value Sr and the slip threshold Sth.

The first reduction amount calculating section 23c calculates the first reduction amount C1, based on the first excessive slip value ΔS1. The first reduction amount calculating section 23c in this example includes a proportional processing section 23d and a differential processing section 23e.

The proportional processing section 23d calculates a proportional reduction amount Cp that is proportional to the first excessive slip value ΔS1, using a formula and a coefficient stored beforehand in the storage unit 29. For example, the proportional processing section 23d multiplies the first excessive slip value ΔS1 by a predetermined coefficient (hereinafter referred to as a torque conversion coefficient) to set the obtained value as the proportional reduction amount Cp. The first excessive slip value ΔS1 is a value of the dimension of the speed (m/s). The proportional processing section 23d multiplies the first excessive slip value ΔS1 by the torque conversion coefficient to thereby calculate a proportional reduction amount Cp having the dimension of a torque and having a magnitude in accordance with the first excessive slip value ΔS1.

Preferably, the torque conversion coefficient is determined in accordance with the speed reduction ratio of the transmission of the engine 8. For example, for a higher speed reduction ratio (e.g., when the transmission is set at LOW), a large value is set for the torque conversion coefficient, while, for a smaller speed reduction ratio (e.g., when the transmission is set at TOP), a smaller value is set for the torque conversion coefficient.

The differential processing section 23e calculates a differential reduction amount Cd in accordance with the change speed of the actual slip value Sr. That is, the differential processing section 23e increases the differential reduction amount Cd as the change speed of the actual slip value Sr becomes higher. For example, the differential processing section 23e multiplies the change speed of the first excessive slip value ΔS1 by the torque conversion coefficient to set the obtained value as the differential reduction amount Cd. The change speed of the first excessive slip value ΔS1 is of the dimension of the acceleration (m/s2). The differential processing section 23e multiplies the change speed of the first excessive slip value ΔS1 by the torque conversion coefficient to thereby calculate a differential reduction amount Cd having the dimension of a torque and having a magnitude in accordance with the change speed of the first excessive slip value ΔS1. Processing by the differential processing section 23e is not limited to the above. For example, the differential processing section 23e may calculate the differential reduction amount Cd, based on the change speed of the first excessive slip value ΔS1, instead of that of the actual slip value Sr.

The first reduction amount calculating section 23c calculates the first reduction amount C1, based on the proportional reduction amount Cp and the differential reduction amount Cd. Specifically, the first reduction amount calculating section 23c determines the sum of the proportional reduction amount Cp and the differential reduction amount Cd as the first reduction amount C1.

As described above, the first reduction amount C1 is calculated based on the proportional reduction amount Cp that is proportional to the first excessive slip value ΔS1. Thus, as the first excessive slip value ΔS1 becomes larger, that is, as the actual slip value Sr becomes higher, the throttle valve opening degree becomes smaller through the processing by the throttle valve control section 24, to be described later, and accordingly, the engine torque actually output from the engine 8 decreases. As a result, when the actual slip value Sr increases toward the target slip value Stg, the increase speed of the actual slip value Sr becomes slower as the actual slip value Sr is getting closer to the target slip value Stg (see FIG. 3). Also, the first reduction amount C1 is calculated based on a differential reduction amount Cd in accordance with the change speed of the actual slip value Sr, in addition to the proportional reduction amount Cp. Therefore, it is possible to effectively prevent a significant increase in the actual slip value Sr.

As shown in FIG. 4, the first reducing processing section 23a includes a first determining section 23j. The first determining section 23j determines whether or not the actual slip value Sr is higher than the slip threshold Sth. When the actual slip value Sr is higher than the slip threshold Sth, the first excessive slip value ΔS1 takes a positive value. In this case, the proportional processing section 23d calculates the proportional reduction amount Cp through the above described processing. Meanwhile, when the actual slip value Sr is equal to or smaller than the slip threshold Sth, the first excessive slip value ΔS1 takes a negative value. In this example, when the first excessive slip value ΔS1 takes a negative value, the proportional processing section 23d sets the proportional reduction amount Cp to 0, irrespective of the first excessive slip value ΔS1. Further, when the actual slip value Sr is larger than the slip threshold Sth, that is, only when the first excessive slip value ΔS1 is larger than 0, the differential processing section 23e calculates the differential reduction amount Cd through the above described processing. With the above, it is possible to prevent the first reduction amount C1 from having a value larger than 0 under a driving condition with the actual slip value Sr being lower than the slip threshold Sth. Note that processing for preventing the first reduction amount C1 from having a value larger than 0 when the actual slip value Sr is lower than the slip threshold Sth is not limited to the above. For example, when the actual slip value Sr is lower than the slip threshold Sth, the first reduction amount calculating section 23c may set the first reduction amount C1 to 0, irrespective of the proportional reduction amount Cp and the differential reduction amount Cd.

The second reducing processing section 23f calculates the second reduction amount C2, based on the difference ΔS2 (see FIG. 3) between the actual slip value Sr and the target slip value Stg, when the actual slip value Sr is higher than the target slip value Stg.

In this example, as shown in FIG. 4, the second reducing processing section 23f includes a second excessive slip value calculating section 23g and a second reduction amount calculating section 23h.

The second excessive slip value calculating section 23g calculates the difference between the actual slip value Sr and the target slip value Stg (Sr−Stg, hereinafter referred to as a second excessive slip value ΔS2).

The second reduction amount calculating section 23h calculates the second reduction amount C2, based on the second excessive slip value ΔS2. The second reduction amount C2 calculated by the second reduction amount calculating section 23*h* becomes larger as the second excessive slip value ΔS2 becomes larger or the remaining period of time in which the second excessive slip value ΔS2 remains (a period of time elapsed after the second excessive slip value ΔS2 becomes a positive value) becomes longer. In this example, the second reduction amount calculating section 23*h* executes integral processing of the second excessive slip value ΔS2. That is, when the actual slip value Sr exceeds the target slip value Stg, the second reduction amount calculating section 23*h* start to integrate, by time, the second excessive slip value ΔS2. Then, the second reduction amount calculating section 23*h* calculates a value proportional to the integrated value of the second excessive slip value ΔS2 as the second reduction amount C2. For example, the second reduction amount calculating section 23*h* multiplies the integrated value of the second excessive slip value ΔS2 by the torque conversion coefficient to determine the obtained value as the second reduction amount C2.

Processing by the second reduction amount calculating section 23*h* is not limited to the above. For example, the second reduction amount calculating section 23*h* may execute differential processing in addition to integral processing. That is, the second reduction amount calculating section 23*h* may multiply the sum of the change speed of the second excessive slip value ΔS2 and the above described integrated value by a torque conversion coefficient to set the obtained value as the second reduction amount C2. Further, the second reduction amount calculating section 23*h* may calculate the second reduction amount C2, based on a value proportional to the second excessive slip value ΔS2.

The second reducing processing section 23*f* includes a second determining section 23*k* that determines whether or not the actual slip value Sr is higher than the target slip value Stg. When the actual slip value Sr is higher than the target slip value Stg, the second reduction amount calculating section 23*h* executes the above described processing to calculate the second reduction amount C2. That is, when determination by the second determining section 23*k* that the actual slip value Sr is equal to or smaller than the target slip value Stg is changed to determination that the actual slip value Sr is higher than the target slip value Stg, the second reducing processing section 23*f* starts integration of the second excessive slip value ΔS2 to calculate the second reduction amount C2, based on the integrated value of the second excessive slip value ΔS2.

Meanwhile, when the actual slip value Sr is equal to or smaller than the target slip value Stg, the second reduction amount calculating section 23*h* sets the second reduction amount C2 to 0 irrespective of the second excessive slip value ΔS2. When the actual slip value Sr, having once exceeded the target slip value Stg, again falls below the target slip value Stg, the second reduction amount calculating section 23*h* may gradually reduce the second reduction amount C2, rather than instantly setting the second reduction amount C2 to zero. For example, the second reduction amount calculating section 23*h* may continue integration of the second excessive slip value ΔS2 even when the actual slip value Sr falls below the target slip value Stg. When the actual slip value Sr falls below the target slip value Stg, the second excessive slip value ΔS2 takes a negative value. Therefore, when the second reduction amount calculating section 23*h* continues integration of the second excessive slip value ΔS2 after the actual slip value Sr falls below the target slip value Stg, the integrated value of the second excessive slip value ΔS2 becomes gradually smaller. As a result, the second reduction amount C2 as well becomes gradually smaller. In this processing, the second reduction amount calculating section 23*h* may set the second reduction amount C2 to 0 after the integrated value of the second excessive slip value ΔS2 becomes 0.

As shown in FIG. 4, the torque reducing processing section 23 includes a total reduction amount calculating section 23*i*. The total reduction amount calculating section 23*i* calculates a total reduction amount C, based on the first reduction amount C1 and the second reduction amount C2. The total reduction amount calculating section 23*i* in this example sets the sum of the first reduction amount C1 and the second reduction amount C2 as the total reduction amount C.

The throttle valve control section 24 will be described. As described above, the throttle valve control section 24 calculates a throttle valve opening degree, based on the first reduction amount C1 and the second reduction amount C2. The throttle valve control section 24 in this example calculates the throttle valve opening degree, based on the total reduction amount C, that is, the sum of the first reduction amount C1 and the second reduction amount C2, and the engine torque (hereinafter referred to as a basic torque Tb) calculated based on the accelerator opening degree and the engine speed.

As shown in FIG. 4, the throttle valve control section 24 includes a basic torque calculating section 24*a*, a corrected torque calculating section 24*b*, a corrected valve opening degree calculating section 24*c*, and a basic valve opening degree calculating section 24*d*.

The basic torque calculating section 24*a* calculates an engine torque, based on the accelerator opening degree and the engine speed (a torque calculated by the basic torque calculating section 24*a* is hereinafter referred to as a basic torque Tb). In this example, the basic torque calculating section 24*a* calculates the basic torque Tb, based on a throttle valve opening degree (hereinafter referred to as a basic valve opening degree) in accordance with the actual accelerator opening degree (an accelerator opening degree detected based on a signal output from the accelerator position sensor 33) and the actual engine speed (an engine speed calculated based on a signal output from the engine speed sensor 34). Specifically, the basic torque calculating section 24*a* calculates an engine torque in accordance with the basic valve opening degree and the actual engine speed as the basic torque Tb, referring to a map that correlates the throttle valve opening degree, the engine speed, and the engine torque to one another (hereinafter referred to as an engine torque map).

The basic valve opening degree is calculated by the basic valve opening degree calculating section 24*d*. The basic valve opening degree calculating section 24*d* calculates, as a basic valve opening degree, a throttle valve opening degree in accordance with the actual accelerator opening degree, using a map that correlates the accelerator opening degree to the throttle valve opening degree (hereinafter referred to as a valve control map) and a relation formula. The valve control map and the engine torque map are stored beforehand in the storage unit 29.

The corrected torque calculating section 24*b* calculates a torque obtained by correcting the basic torque Tb, based on the total reduction amount C (hereinafter referred to as a corrected torque Ta). Specifically, the corrected torque calculating section 24*b* defines, as the corrected torque Ta, a value (Tb−C) obtained by subtracting the total reduction amount C from the basic torque Tb.

The corrected valve opening degree calculating section 24*c* calculates the throttle valve opening degree, based on the corrected torque Ta (a throttle valve opening degree calculated by the corrected valve opening degree calculating section 24*c* is hereinafter referred to as a corrected valve opening degree). Specifically, the corrected valve opening degree calculating section 24*c* calculates, as the corrected valve opening degree, a throttle valve opening degree in accordance with the corrected torque Ta and the actual engine speed, while referring to the above described engine torque map.

When the second reduction amount C2 is 0 (in the above description, before the actual slip value Sr reaches the target slip value Stg or after elapse of a predetermined period of time after the actual slip value Sr, once having exceeded the target slip value Stg, again falls below the target slip value Stg, that is, when an integrated value of the second excessive slip value ΔS2 becomes 0), the corrected torque Ta takes a value based on the first reduction amount C1. Therefore, in that case, the corrected valve opening degree calculated by the corrected valve opening degree calculating section 24c is set as a degree which decreases the engine torque by an amount in accordance with the first reduction amount C1. That is, the engine torque due to the corrected valve opening degree is smaller by the first reduction amount C1, compared to the engine torque due to the basic valve opening degree. On the other hand, when the actual slip value Sr is higher than the target slip value Stg, the second reduction amount C2 has a value based on the second excessive slip value ΔS2. Thus, the corrected torque Ta takes a value based on the first reduction amount C1 and the second reduction amount C2. Therefore, the corrected valve opening degree calculated by the corrected valve opening degree calculating section 24c when the actual slip value Sr is higher than the target slip value Stg is set as a degree that decreases the engine torque by an amount in accordance with the first reduction amount C1 and the second reduction amount C2. That is, the engine torque obtained when the opening degree of the throttle valve 14 is set to the corrected valve opening degree is smaller by the amount of the sum of the first reduction amount C1 and the second reduction amount C2, compared to the engine torque obtained when the opening degree of the throttle valve 14 is set to the basic valve opening degree.

As described above, the second reduction amount C2 becomes a value proportional to an integrated value of the second excessive slip value ΔS2, rather than a value proportional to the second excessive slip value ΔS2 or the change speed of the second excessive slip value ΔS2. Therefore, compared to a case in which the second reduction amount C2 takes a value proportional to the second excessive slip value ΔS2 or the change speed of the second excessive slip value ΔS2, a longer period of time is necessary before the second reduction amount C2 becomes larger. Therefore, change in the corrected valve opening degree at a moment when the actual slip value Sr exceeds the target slip value Stg is small, and accordingly, a significant decrease in the engine torque is prevented.

When the actual slip value Sr is higher than the slip threshold Sth, that is, when the control unit 22 executes traction control, the throttle valve control section 24 sets the opening degree of the throttle valve 14 to the corrected valve opening degree. That is, the throttle valve control section 24 outputs a signal in accordance with the corrected valve opening degree to the driving circuit 28, and activates the actuator 14a so that the opening degree of the throttle valve 14 becomes the same as the corrected valve opening degree. The throttle valve control section 24 in this example includes a throttle valve opening degree output section 24e. The throttle valve opening degree output section 24e selects either one of the basic valve opening degree and the corrected valve opening degree, based on the total reduction amount C, and outputs a signal in accordance with the selected valve opening degree to the driving circuit 28. Specifically, when the total reduction amount C is larger than 0, that is, when the actual slip value Sr is higher than the slip threshold Sth, the throttle valve opening degree output section 24e outputs a signal in accordance with the corrected valve opening degree to the driving circuit 28. When the total reduction amount C is 0, that is, when the actual slip value Sr is equal to or smaller than the slip threshold Sth, the throttle valve opening degree output section 24e outputs a signal in accordance with the basic valve opening degree to the driving circuit 28.

Figure 7:
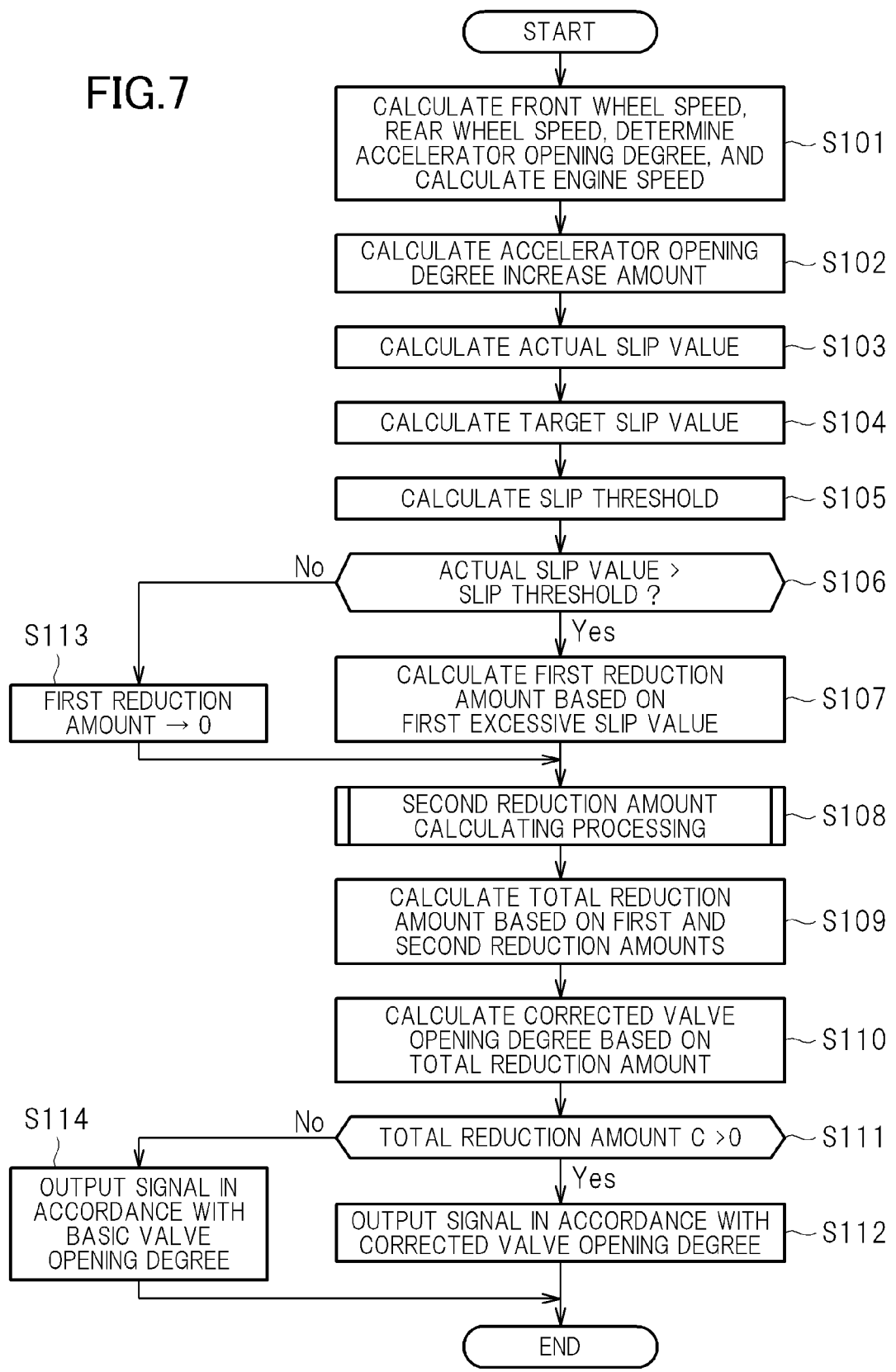
FIG. 7 is a flowchart of an example processing executed by the control unit.

Hereinafter, a flow of processing executed by the control unit 22 will be described. FIG. 7 is a flowchart of an example processing executed by the control unit 22. The control unit 22 repetitively executes processing described below while the engine 8 is activating.

Initially, the control unit 22 calculates the front wheel speed Vf, the rear wheel speed Vr, and the engine speed, and detects the accelerator opening degree (S101). Further, the control unit 22 calculates an increase amount of the accelerator opening degree, based on the detected accelerator opening degree (S102). Thereafter, the actual slip value calculating section 22a calculates the actual slip value Sr (Sr=Vr−Vf), based on the rear wheel speed Vr and the front wheel speed Vf (S103). Further, the target slip value calculating section 22b calculates the target slip value Stg, based on the accelerator opening degree (S104). Specifically, as described above, the target slip value calculating section 22b calculates a target slip value Stg in accordance with the accelerator opening degree detected at S101, while referring to the target slip value map (see FIG. 5). Further, the slip threshold calculating section 22c calculates the slip threshold Sth, based on the accelerator opening degree increase amount calculated at S102 (S105). Specifically, the slip threshold calculating section 22c calculates a slip threshold Sth in accordance with the accelerator opening degree increase amount, referring to the slip threshold map (see FIG. 6).

Thereafter, the first determining section 23j determines whether or not the actual slip value Sr is higher than the slip threshold Sth (S106). When the actual slip value Sr is equal to or smaller than the slip threshold Sth (S106: No), the first reducing processing section 23a sets the first reduction amount C1 to 0 (S113). Meanwhile, when the actual slip value Sr is higher than the slip threshold Sth (S106: Yes), the first reducing processing section 23a calculates the first reduction amount C1, based on the first excessive slip value ΔS1 and the change speed of the actual slip value Sr (S107). Further, the second reducing processing section 23f executes second reduction amount calculating processing to calculate the second reduction amount C2 (S108). A specific flow of the second reduction amount calculating processing will be described later in detail.

Thereafter, the total reduction amount calculating section 23i calculates the total reduction amount C (C=C1+C2 in the above description), based on the first reduction amount C1 and the second reduction amount C2 (S109). Then, the corrected valve opening degree calculating section 24c calculates the corrected valve opening degree, based on the total reduction amount C and the accelerator opening degree and engine speed obtained in the processing at S101 (S110).

Thereafter, the throttle valve opening degree output section 24e determines whether or not the total reduction amount C is larger than 0, that is, whether or not the actual slip value Sr is larger than the slip threshold Sth (S111). When the total reduction amount C is larger than 0 (S111: Yes), the throttle valve opening degree output section 24e outputs a signal in accordance with the corrected valve opening degree to the driving circuit 28 (S112). Meanwhile, when the total reduction amount C is 0 (S111: No), that is, when the actual slip value Sr is equal to or smaller than the slip threshold Sth, the throttle valve opening degree output section 24e outputs a signal in accordance with the basic valve opening degree in accordance with the accelerator opening degree detected at S101 to the driving circuit 28 (S114).

Figure 8:
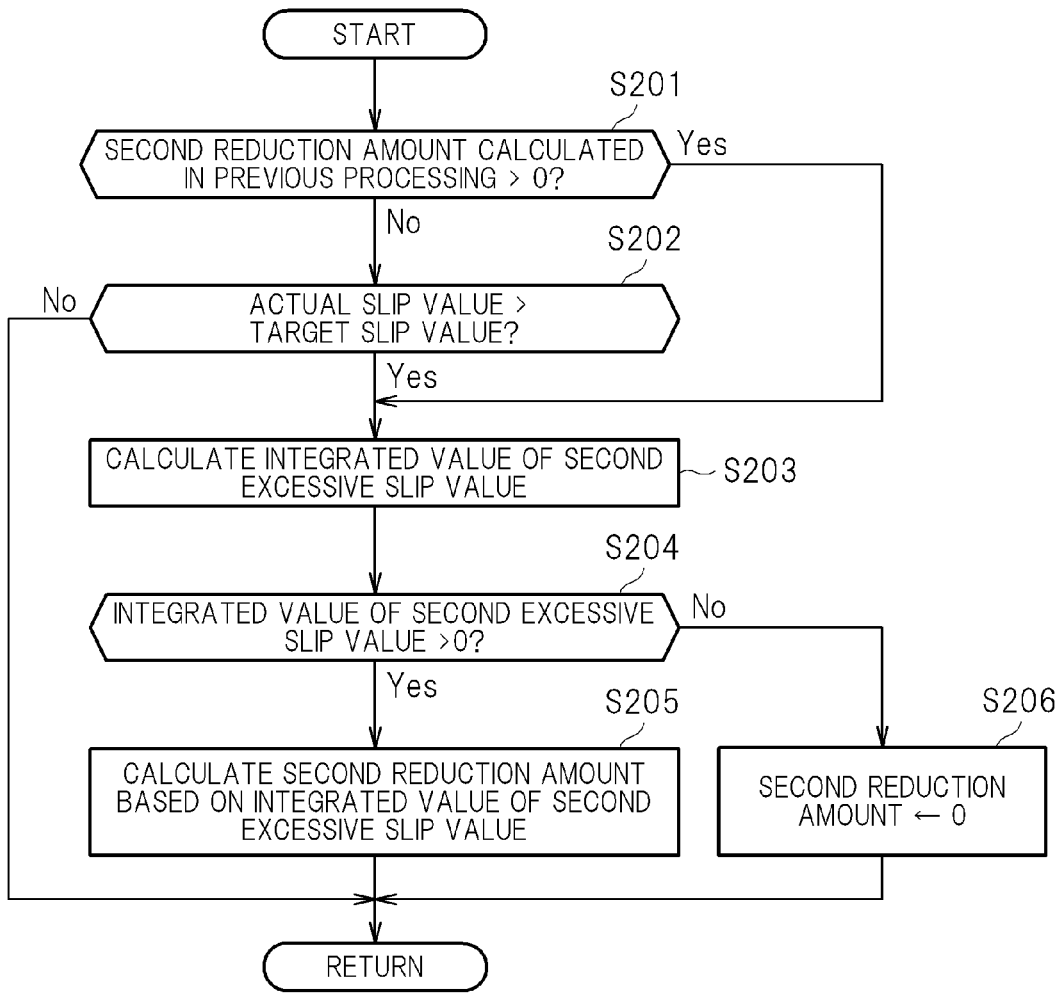
FIG. 8 is a flowchart of an example of second reduction amount calculating processing shown in FIG. 7.

FIG. 8 is a flowchart showing an example of second reduction amount calculating processing executed by the second reducing processing section 23f (processing at S108 in FIG. 7). In the following example processing, even after the actual slip value Sr, having once exceeded the target slip value Stg, again falls below the target slip value Stg, integration of the second excessive slip value ΔS2 continues and then the second reduction amount C2 is calculated based on the integrated value. The following processing is repetitively executed in a predetermined cycle, similar to the processing shown in FIG. 7.

Initially, the second reducing processing section 23f determines whether or not the second reduction amount C2 obtained in the previous processing is larger than 0 (S201). When the previous second reduction amount C2 is 0, the second determining section 23k then determines whether or not the actual slip value Sr calculated at S101 is higher than the target slip value Stg calculated similarly at S101 (S202). When the actual slip value Sr is equal to or smaller than the target slip value Stg (S202: No), the second reduction amount calculating section 23h finishes the current processing while keeping the second reduction amount C2 set to 0. In the processing at S201 and S202, it is determined whether or not the current processing is executed after the actual slip value Sr exceeds the target slip value Stg. That is, referring to FIG. 3, it is determined whether or not the current processing is executed after t3. Before t3, the second reduction amount C2 is maintained at 0.

When the previous second reduction amount C2 is larger than 0 (S201: Yes) at S201 or when the actual slip value Sr is higher than the target slip value Stg at S202 (S202: Yes), the second reduction amount calculating section 23h calculates an integrated value of the second excessive slip value ΔS2 (S203). That is, the second reduction amount calculating section 23h calculates the second excessive slip value ΔS2, based on the actual slip value Sr and the target slip value Stg calculated at S101, and adds the calculated second excessive slip value ΔS2 to the integrated value of the second excessive slip value ΔS2 calculated in the previous processing. Then, the second reduction amount calculating section 23h sets the obtained value as the integrated value of the second excessive slip value ΔS2. Thereafter, the second reduction amount calculating section 23h determines whether or not the integrated value calculated at S203 is larger than 0 (S204). When the integrated value is equal to or smaller than 0 (S204: No), the second reduction amount calculating section 23h sets the second reduction amount C2 to 0 (S206). Meanwhile, when the integrated value is larger than 0 (S204: Yes), the second reduction amount calculating section 23h calculates the second reduction amount C2, based on the integrated value (S205). Based on the second reduction amount C2 obtained in the processing at S205 or S206, processing at S109 and thereafter, shown in FIG. 7, is executed.

The motorcycle 1 described above includes the target slip value calculating section 22b that calculates the target slip value Stg, based on an accelerator operation by the driver, and the actual slip value calculating section 22a that calculates the actual slip value Sr, based on the difference between the front wheel speed Vf and the rear wheel speed Vr. Further, the motorcycle 1 includes the engine control section 22d that reduces the engine torque, based on the difference between the actual slip value Sr and a criterion value (in this example, slip threshold Sth) that is different from the target slip value Stg when the actual slip value Sr is lower than the target slip value Stg.

According to the above-described motorcycle 1, even when the actual slip value Sr is lower than the target slip value Stg, the engine torque is reduced. Therefore, when the actual slip value Sr exceeds the target slip value Stg, it is possible to have the actual slip value Sr follow the target slip value Stg without the need for a significant decrease in the engine torque. Further, when the actual slip value Sr is lower than the target slip value Stg, the engine torque is reduced based on the difference between the actual slip value Sr and the criterion value (the slip threshold Sth in the above description). Thus, it is possible to prevent an increase in the engine torque irrespective of an accelerator operation by the driver when the actual slip value Sr is lower than the target slip value Stg, and thus to improve the comfort of riding on the motorcycle.

Further, according to the motorcycle 1, the engine control section 22d includes the first determining section 23j that determines whether or not the actual slip value Sr is higher than the slip threshold Sth that is lower than the target slip value Stg, and reduces the engine torque when the actual slip value Sr is higher than the slip threshold Sth. With the above, it is possible to prevent execution of traction control in response to a slight slip.

Further, the motorcycle 1 includes the slip threshold calculating section 22c that calculates the slip threshold Sth, based on an accelerator operation by the driver. Therefore, it is possible to change a time to start traction control, based on the accelerator operation.

Further, according to the motorcycle 1, the slip threshold calculating section 22c calculates the slip threshold Sth, based on the change amount of the accelerator opening degree within a predetermined period of time (the accelerator opening degree increase amount in the above description). With the above, it is possible to prevent traction control from starting when the change amount of the accelerator operation is small.

Further, according to the motorcycle 1, the slip threshold Sth calculated by the slip threshold calculating section 22c is set as the above described criterion value. With the above, the difference between the actual slip value Sr and the criterion value which is the slip threshold Sth can be small, when the driver strongly requests acceleration by making a large accelerator operation. As a result, it is possible to prevent an excessive decrease in the engine torque over necessity when the acceleration request is strong, and thus to reflect the acceleration request by the driver on vehicle acceleration.

Further, according to the motorcycle 1, the target slip value calculating section 22b sets the target slip value Stg, based on the accelerator opening degree. With the above configuration, not only when the accelerator opening degree increases but also when the accelerator opening degree is maintained at a high value, the target slip value Stg can be set high.

Further, according to the motorcycle 1, the target slip value calculating section 22b calculates the target slip value Stg, based on the front wheel speed Vf and an accelerator operation by the driver. With the above configuration, when the vehicle speed is high, it is possible to set the target slip value Stg to a high value in accordance with the high vehicle speed. As a result, it is possible to attain preferable acceleration at high speed driving.

Further, according to the motorcycle 1, the engine control section 22d includes the second determining section 23k that determines whether or not the actual slip value Sr is higher than the target slip value Stg. Then, when the actual slip value Sr is higher than the target slip value Stg, the engine control section 22d reduces the engine torque, based on the difference between the target slip value Stg and the actual slip value Sr. With the above, when the actual slip value Sr is higher than the target slip value Stg, it is possible to reduce the actual slip value Sr toward the target slip value Stg.

Further, according to the motorcycle 1, when the actual slip value Sr is lower than the target slip value Stg, the engine control section 22d calculates a control parameter for the engine 8 (the throttle valve opening degree in the above description), based on the difference (the first excessive slip value $\Delta S1$ in the above description) between the actual slip value Sr and the criterion value (the slip threshold Sth in the above description). Further, when the actual slip value Sr is higher than the target slip value Stg, the engine control section 22d calculates the control parameter, based on the difference $\Delta S1$ between the actual slip value Sr and the criterion value and the difference (the second excessive slip value $\Delta S2$ in the above description) between the actual slip value Sr and the target slip value Stg. That is, according to the motorcycle 1, the difference $\Delta S1$ between the actual slip value Sr and the criterion value is utilized both before and after the actual slip value Sr exceeds the target slip value Stg in order to calculate the control parameter. Further, immediately after the actual slip value Sr exceeds the target slip value Stg, the difference $\Delta S2$ between the actual slip value Sr and the target slip value Stg has a small value. Thus, it is possible to prevent an abrupt change in the control parameter when the actual slip value Sr exceeds the target slip value Stg. As a result, it is possible to prevent a significant decrease in the engine torque when the actual slip value Sr exceeds the target slip value Stg.

Further, according to the motorcycle 1, the engine control section 22d includes the first reducing processing section 23a that calculates a first value (the first reduction amount C1 in the above description), based on the difference $\Delta S1$ between the actual slip value Sr and the criterion value. Further, the engine control section 22d includes the second reducing processing section 23f for starting, when the actual slip value Sr exceeds the target slip value Stg, integral processing by time of the difference $\Delta S2$ between the actual slip value Sr and the target slip value Stg to calculate a second value (the second reduction amount C2 in the above description) in accordance with the integrated value obtained in the integral processing. When the actual slip value Sr is higher than the target slip value Stg, the engine control section 22d calculates the control parameter such that the engine torque drops by an amount in accordance with the first reduction amount C1 and the second reduction amount C2. As described above, since the second reduction amount C2 has a value in accordance with the integrated value of the difference $\Delta S2$ between the actual slip value Sr and the target slip value Stg, it takes some time before the second reduction amount C2 comes to have a large value. As a result, it is possible to effectively prevent a significant decrease in the engine torque when the actual slip value Sr exceeds the target slip value Stg.

Further, according to the motorcycle 1, the engine control section 22d calculates the first reduction amount C1, based on the difference $\Delta S1$ between the actual slip value Sr and the criterion value, and further calculates the control parameter for the engine 8, based on the first reduction amount C1. This facilitates control of the reduction amount of the engine torque actually output from the engine 8, compared to a case in which the control parameter is calculated based directly on the difference $\Delta S1$ between the actual slip value Sr and the criterion value.

Note that the present invention is not limited to the above described motorcycle 1, and various modifications are possible. For example, in the above description, the actual slip value Sr preferably is the difference (Vr−Vf) between the front wheel speed Vf and the rear wheel speed Vr. However, the actual slip value Sr may be a slip ratio ((Vr−Vf)/Vf).

Further, in the above description, the engine torque is preferably reduced based on the difference between the actual slip value Sr and the slip threshold Sth also when the actual slip value Sr is higher than the target slip value Stg. However, this processing may be executed only when the actual slip value Sr is higher than the slip threshold Sth but lower than the target slip value Stg. Then, when the actual slip value Sr is higher than the target slip value Stg, the engine torque may be reduced based solely on the difference between the actual slip value Sr and the target slip value Stg.

Further, in the above description, the slip threshold Sth is preferably set as the criterion value. However, a value lower than the slip threshold Sth may be set as the criterion value.

Further, in the above description, a throttle valve opening degree is preferably utilized as a control parameter for the engine 8 to increase/decrease the engine torque. However, instead of, or in addition to, the throttle valve opening degree, an ignition time and the fuel injection amount for the injector 15 may be used as a control parameter for the engine 8 to increase/decrease the engine torque.

Figure 9:
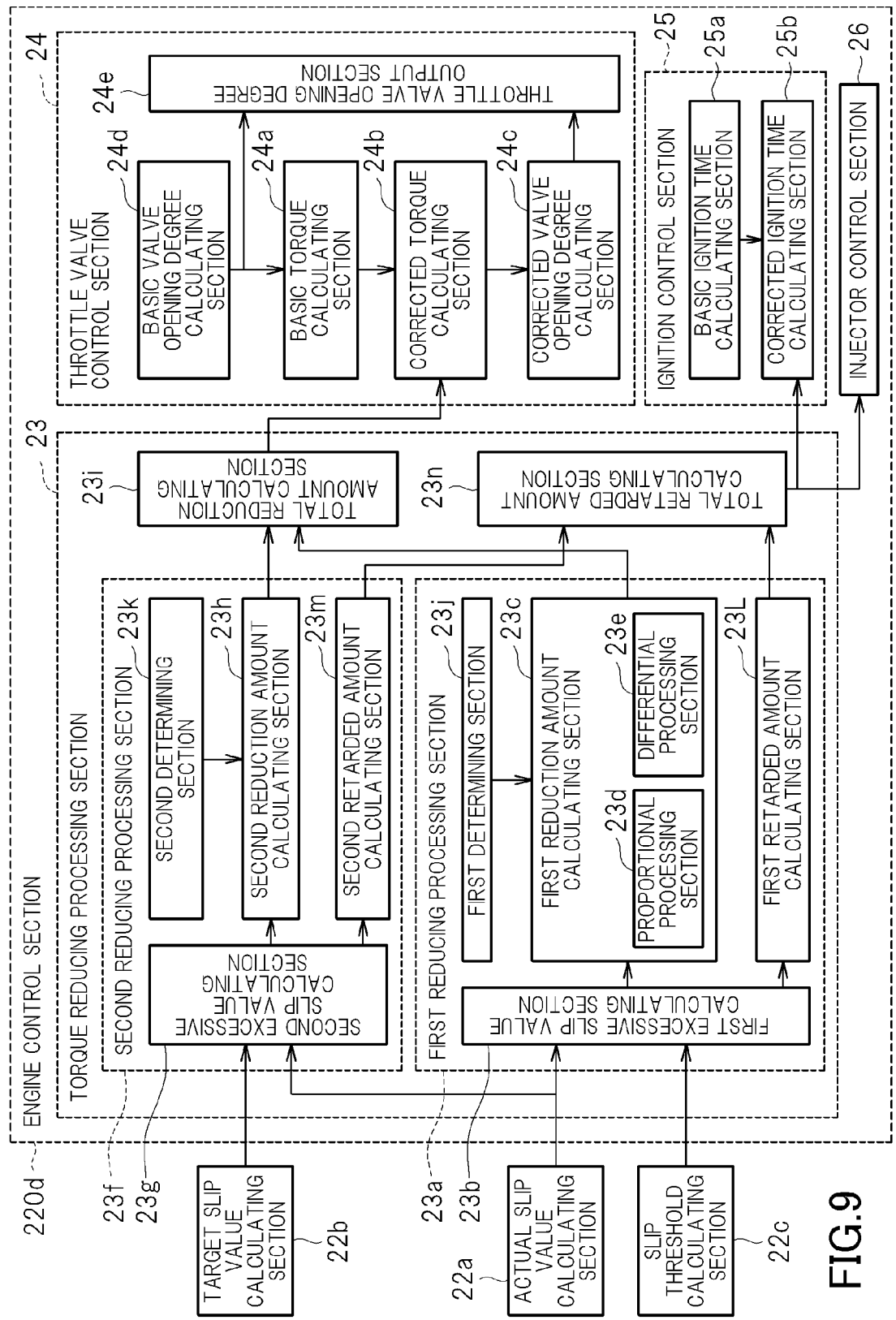
FIG. 9 is a block diagram showing functions of a control unit of a motorcycle according to another preferred embodiment of the present invention.

FIG. 9 is a functional block diagram for an example of a control unit of the motorcycle in the above mentioned preferred embodiment. The engine control section 220d of the control unit in this preferred embodiment includes an ignition control unit 25 and an injector control unit 26 in addition to the torque reducing processing section 23 and the throttle valve control section 24. Further, in the engine control section 220d, the first reducing processing section 23a includes a first retarded amount calculating section 23L in addition to the above described functions, and the second reducing processing section 23f includes a second retarded amount calculating section 23m.

The first retarded amount calculating section 23L calculates a retarded amount for an ignition time, based on the first excessive slip value $\Delta S1$ when the actual slip value Sr is higher than the slip threshold Sth (a retarded amount calculated by the first retarded amount calculating section 23L is hereinafter referred to as a first retarded amount D1).

In this example, the first retarded amount calculating section 23L calculates the first retarded amount D1, based on the change speed of the actual slip value Sr or that of the first excessive slip value $\Delta S1$. For example, the first retarded amount calculating section 23L multiplies the change speed of the actual slip value Sr or that of the first excessive slip value $\Delta S1$ by a retarded amount conversion coefficient to set the obtained value to the first retarded amount D1. With the above, it is possible to compensate for a delay in response in control by the throttle valve control section 24. That is, there is a case in which reduction of the engine torque (that is, reduction of the throttle value opening degree) cannot be attained promptly enough in view of the increased speed of the actual slip value Sr by sole control by the throttle valve control section 24 because the increased speed of the actual slip value Sr is fast. This situation can be prevented when the first retarded amount calculating section 23L calculates the first retarded amount D1, based on the change speed of the actual slip value Sr or the first excessive slip value $\Delta S1$.

The first retarded amount calculating section 23L may calculate a value proportional to the first excessive slip value $\Delta S1$ as the first retarded amount D1. For example, the first retarded amount calculating section 23L multiplies the first excessive slip value $\Delta S1$ by a predetermined coefficient (hereinafter referred to as a retarded amount conversion coefficient) to determine the obtained value as the first retarded amount D1.

Further, the first retarded amount calculating section 23L may determine, as the first retarded amount D1, the sum of a value obtained by multiplying the first excessive slip value ΔS1 by the retarded amount conversion coefficient and a value obtained by multiplying the change speed of the actual slip value Sr or the first excessive slip value ΔS1 by the retarded amount conversion coefficient.

As described above, the first reducing processing section 23a preferably includes the first determining section 23j that determines whether or not the actual slip value Sr is higher than the slip threshold Sth. When the actual slip value Sr is equal to or smaller than the slip threshold Sth, the first retarded amount calculating section 23L sets the first retarded amount D1 to 0, irrespective of the result of the above described processing.

When the actual slip value Sr is higher than the target slip value Stg, the second reducing processing section 23f calculates the retarded amount for the ignition time, based on the second excessive slip value ΔS2 (a retarded amount calculated by the second retarded amount calculating section 23m is hereinafter referred to as a second retarded amount D2). For example, the second retarded amount calculating section 23m calculates the second retarded amount D2, based on the integrated value of the second excessive slip value ΔS2. That is, the second retarded amount calculating section 23m start to integrate, by time, the second excessive slip value ΔS2 at a time at which the actual slip value Sr exceeds the target slip value Stg, and calculates the second retarded amount D2, based on the obtained value. For example, the second retarded amount calculating section 23m multiplies the integrated value of the second excessive slip value ΔS2 by the retarded amount conversion coefficient to determine the obtained value as the second retarded amount D2.

As described above, the second reducing processing section 23f preferably includes the second determining section 23k that determines whether or not the actual slip value Sr is higher than the target slip value Stg. When the actual slip value Sr is equal to or smaller than the target slip value Stg, the second retarded amount calculating section 23m sets the second retarded amount D2 to 0 irrespective of the result of the above described processing.

Processing by the second retarded amount calculating section 23m is not limited to the above, and, for example, the second retarded amount calculating section 23m may determine a value proportional to the second excessive slip value ΔS2 or a value proportional to the change speed of the second excessive slip value ΔS2 as the second retarded amount D2.

In the engine control section 220d, the torque reducing processing section 23 includes a total retarded amount calculating section 23n. The total retarded amount calculating section 23n calculates a total retarded amount D, based on the first retarded amount D1 and the second retarded amount D2. Specifically, the total retarded amount calculating section 23n determines, as the total retarded amount D, the sum of the first retarded amount D1 and the second retarded amount D2.

The ignition control unit 25 includes a basic ignition time calculating section 25a and a corrected ignition time calculating section 25b. The basic ignition time calculating section 25a calculates an ignition time, based on the engine speed and the air pressure of the suction pipe 12 (an ignition time calculated by the basic ignition time calculating section 25a is hereinafter referred to as a basic time Eb).

The corrected ignition time calculating section 25b calculates the ignition time, based on the basic time Eb and the total retarded amount D (an ignition time calculated by the corrected ignition time calculating section 25b is hereinafter referred to as a corrected time Ea). Specifically, the corrected ignition time calculating section 25b calculates a time delayed from the basic time Eb by the total retarded amount D, that is, a time obtained by subtracting the total retarded amount D from basic time Eb as a corrected time Ea for actual ignition to the ignition plug 16. The ignition control unit 25 outputs an ignition signal to the driving circuit 28 at a time in accordance with the corrected time Ea to ignite the ignition plug 16 at a time in accordance with the corrected time Ea.

The injector control unit 26 calculates a fuel injection amount for the injector 15, based on the air pressure in the suction pipe 12 and the engine speed. Further, in this preferred embodiment, when the total retarded amount D is larger than a predetermined threshold (hereinafter referred to as a limit retarded value), the injector control unit 26 temporarily stops injection of the fuel by the injector 15. With the above, it is possible to prevent a situation in which fuel is exhausted from the cylinder 8b without being burnt (e.g., by an accidental fire) due to an excessively large total retarded amount D, that is, too late an ignition time defined by the corrected time Ea.

In the above described engine control section 220d, the second reducing processing section 23f includes the second retarded amount calculating section 23m that calculates the second retarded amount D2 when the actual slip value Sr is higher than the target slip value Stg. However, while the first retarded amount calculating section 23L is preferably provided in the first reducing processing section 23a, the second retarded amount calculating section 23m may not be provided in the second reducing processing section 23f.

Further, in the above description, the first reducing processing section 23a preferably calculates the first reduction amount C1 or the first retarded amount D1. However, the first reducing processing section 23a may calculate a correction amount for the fuel injection amount for the injector 15 (hereinafter referred to as a first injection reduction amount F1) in addition to, or instead of, the first reduction amount C1 or the first retarded amount D1, when the actual slip value Sr is higher than the slip threshold Sth. Further, the second reducing processing section 23f calculates either the second reduction amount C2 or the second retarded amount D2. However, the second reducing processing section 23f may calculate a correction amount for the fuel injection amount for the injector 15 (hereinafter referred to as a second injection reduction amount F2) when the actual slip value Sr is higher than the target slip value Stg, in addition to, or instead of, the second reduction amount C2 or the second retarded amount D2. Then, the injector control unit 26 may determine, as an actual fuel injection amount for the injector 15, the amount obtained by subtracting the first injection reduction amount F1 and the second injection reduction amount F2 from the fuel injection amount calculated based on the air pressure in the suction pipe 12 and/or the engine speed.

Further, the engine 8 is preferably mounted as a drive power source in the above described motorcycle 1. However, the drive power source is not limited to an engine, and a motor that operates based on electricity may be mounted as a drive power source.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motorcycle comprising:
   a target slip value calculating section that calculates a target slip value based on an accelerator operation performed by a driver;
   an actual slip value calculating section that calculates an actual slip value based on a difference between a rotation speed of a front wheel and a rotation speed of a rear wheel; and
   a drive power source controller arranged and programmed to reduce an output torque of a drive power source based on a difference between the actual slip value and a criterion value when the actual slip value is lower than the target slip value; wherein
   a minimum target slip value is equal to or larger than a maximum criterion value.

2. The motorcycle according to claim 1, further comprising:
   a determining section that determines whether or not the actual slip is higher than a threshold that is lower than the target slip value; wherein
   the drive power source controller reduces the output torque from the drive power source based on the difference between the criterion value and the actual slip value when the actual slip value is higher than the threshold.

3. The motorcycle according to claim 2, further comprising a slip threshold calculating section that calculates the threshold based on the accelerator operation by the driver.

4. The motorcycle according to claim 3, wherein the slip threshold calculating section calculates the threshold based on a change amount of an accelerator opening degree within a predetermined period of time.

5. The motorcycle according to claim 4, wherein the threshold calculated by the slip threshold calculating section is set as the criterion value.

6. The motorcycle according to claim 1, wherein the target slip value calculating section calculates the target slip value based on an accelerator opening degree.

7. The motorcycle according to claim 1, wherein the target slip value calculating section calculates the target slip value based on the rotation speed of the front wheel and the accelerator operation by the driver.

8. The motorcycle according to claim 1, wherein the drive power source controller includes a determining section that determines whether or not the actual slip value is higher than the target slip value, and reduces the output torque of the drive power source based on a difference between the target slip value and the actual slip value when the actual slip value is higher than the target slip value.

9. The motorcycle according to claim 1, wherein the drive power source controller calculates a control parameter for the drive power source based on a difference between the actual slip value and the criterion value when the actual slip value is lower than the target slip value, and calculates the control parameter based on the difference between the actual slip value and the criterion value and a difference between the actual slip value and the target slip value when the actual slip value is higher than the target slip value.

10. The motorcycle according to claim 9, wherein the drive power source controller includes:
    a first reducing processing section that calculates a first value based on the difference between the actual slip value and the criterion value; and
    a second reducing processing section that executes integral processing of the difference between the actual slip value and the target slip value to calculate a second value in accordance with an integrated value obtained in the integral processing; and
    the drive power source controller calculates the control parameter such that the output torque of the drive power source decreases by an amount in accordance with the first value and the second value when the actual slip value is higher than the target slip value.

11. The motorcycle according to claim 1, wherein the drive power source controller calculates a reduction amount of the output torque of the drive power source based on the difference between the actual slip value and the criterion value, and then calculates a control parameter for the drive power source based on the reduction amount of the output torque.

* * * * *